Oct. 15, 1929.  A. W. KIMBELL  1,732,203
SEPARABLE FASTENER
Filed April 9, 1928
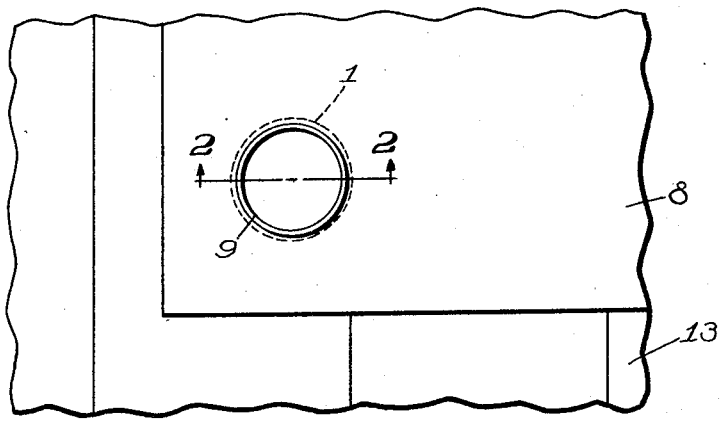
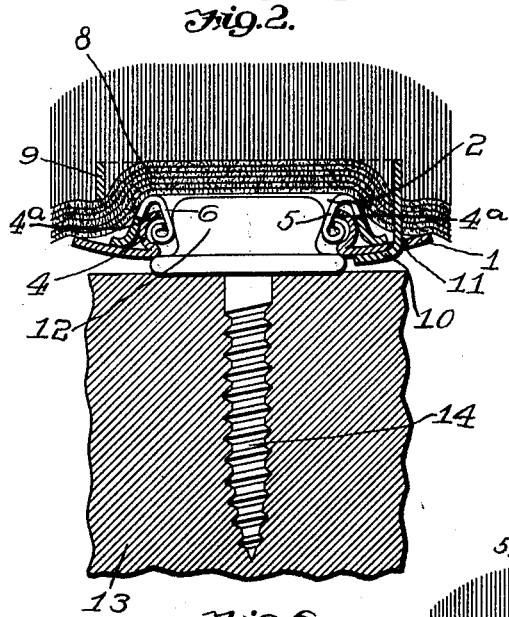
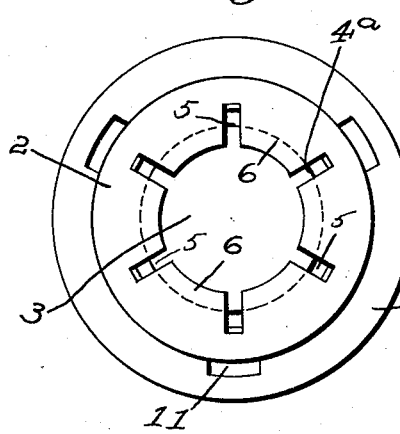
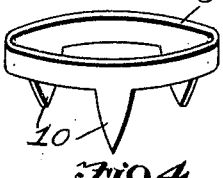
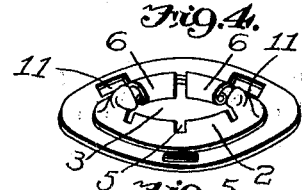
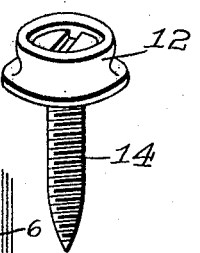
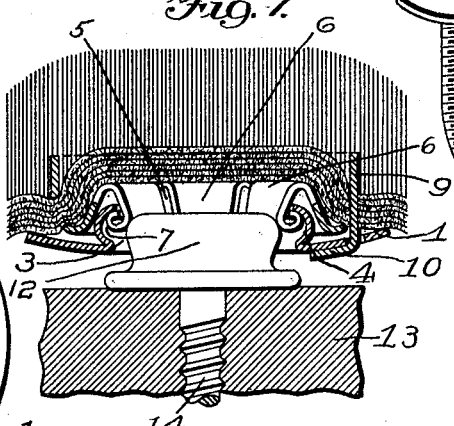
Inventor
Arthur W. Kimbell
By
Attys.

Patented Oct. 15, 1929

1,732,203

UNITED STATES PATENT OFFICE

ARTHUR W. KIMBELL, OF CHICAGO, ILLINOIS, ASSIGNOR TO CINCH MANUFACTURING CORPORATION, OF CHICAGO, ILLINOIS, A CORPORATION OF ILLINOIS

SEPARABLE FASTENER

Application filed April 9, 1928. Serial No. 268,772.

My invention has to do with snap fastening elements and is particularly directed to socket means for attachment to carpets and the like.

In the drawings which accompany and form a part of this specification, Figure 1 is a plan view of a portion of a carpet and a floor, and also shows the relative position of the fastening means; Fig. 2 is a section taken on the line 2—2 of Fig. 1, the stud, being shown in elevation; Fig. 3 is a perspective view of the attaching ring; Fig. 4 is a perspective view of the socket proper; Fig. 5 is a perspective view of the stud; Fig. 6 is a plan of the socket proper; and Fig. 7 is a section through the fastener showing the relation of the parts when the stud is contacted with the socket but before the stud-engaging part is expanded.

While the drawing shows the socket as used for attaching a carpet to a floor, I wish to have it understood that the construction and use of the fastening element may be somewhat varied without departing from the spirit of my invention.

The socket, as illustrated in Figs. 2, 4 and 6, has a mounting part 1, here shown as dished in cross-section, and a ring-shaped stud-engaging part 2 assembled with the mounting part 1. In the preferred showing of my invention the mounting part 1 is provided with an aperture 3 and the material pressed out to form the aperture provides a wall 4 of substantial height substantially at a right angle with relation to the mounting part. This wall 4 is somewhat curved in cross-section, as best shown by Fig. 2, and has a rim 4ª extending inwardly from its free edge.

The stud-engaging part 2 is bent up from sheet metal and is preferably inverted V-shaped in cross-section to span the wall 4. The outer peripheral portion of the stud-engaging part 2 is continuous, while the other side is severed by a plurality of cuts 5 to provide a number of annularly arranged resilient fingers 6. The outer ends of the fingers 6 are bent toward the wall 4 to provide a beaded edge 7, the outer diameter of which is larger than the diameter of the aperture 3 surrounded by the rim 4ª. Therefore, when the parts 1 and 2 are finally assembled, the lower edge of the rigid portion of the stud-engaging part 2 rests against the mounting part 1 and the resilient fingers 6 are spaced from the wall sufficiently to permit expansion of the fingers when a stud is engaged therewith or disengaged therefrom. The beaded portion 7 holds the stud-engaging part in assembly with the mounting part (Figs. 2 and 7) and the bead 7 engages the rim 4ª to prevent separation when a stud is pressed into engagement with the fingers 6 as shown in Fig. 7. Once the rounded portion or head of the stud is contacted with the curved portions of the fingers 6, the fingers cannot contract. Upon continued engagement of the stud and socket the bead 7 moves into contact with the rim 4ª and the head of the stud is forced between the fingers. The stud-engaging part may be assembled with the mounting part in any suitable manner. For instance, the parts may be so proportioned as to be necessary to snap the bead 7 past the edge of the rim 4ª, or they may be so proportioned that the bead may pass freely through the aperture surrounded by the rim 4ª and thereafter the ends of the fingers may be spread.

The socket may be secured to the carpet 8 in any of the usual ways well-known to those skilled in the art, but for the purposes of illustration, I have provided a separate ring 9. The ring 9 (Fig. 3) has a number of prongs 10 which are pressed through the carpet and enter apertures 11 in the mounting part 1 and are then bent against the under side of the mounting part, as clearly shown in Fig. 2.

The stud 12, illustrated in Figs. 2 and 5, may be of any type suitable for engagement with the socket. In the present instance, I have shown a well-known type of stud 12 secured to the floor 13 (Figs. 1 and 2) by means of a screw 14.

The socket proper is very simple in construction, being formed of two sheet metal parts which are easily secured together and held in assembled relation by the particular dimensions and construction of the parts. Thus, it is unnecessary to pass the parts through any complicated assembling operations or to employ any additional attaching means for holding the parts together.

I claim:

1. A fastener socket of the class described including a mounting part for attachment to a support, a wall of substantial height extending from said mounting part, and a sheet metal stud-engaging part having a resilient portion snapped past one edge of the said wall passing into an aperture surrounded by said wall and a flange portion of said stud-engaging part provided to assist in holding said parts in assembled relation, said resilient portion being expansible to receive a stud when said parts are assembled.

2. A fastener socket having a mounting part provided with an aperture surrounded by a wall of substantial height extending at substantially a right angle from said mounting part, a stud-receiving ring-shaped part bent to form a V-shaped portion which spans said wall, resilient means provided by a portion of said V-shaped portion, said resilient portion being snapped into interlocking engagement with said wall to secure the parts of the socket together and also intersecting said aperture for receiving a cooperating stud.

3. A fastener socket having a mounting part provided with an aperture surrounded by a wall of substantial height extending at substantially a right angle from said mounting part, a stud-receiving ring-shaped part bent to span said wall, said stud-receiving ring having a continuous rigid portion at the outer side of said wall and a split resilient portion surrounded by said wall for receiving a stud, said split resilient portion having its free end bent outwardly to provide a beaded portion and said wall being curved in cross-section to receive said outwardly beaded portion to hold the parts in assembly while permitting expansion of said resilient portion.

4. A fastener socket having a mounting part provided with an aperture therethrough, a wall of substantial height surrounding said aperture, an inwardly turned rim at the free edge of said wall, a stud-engaging part assembled with said mounting part and having a number of resilient fingers snapped through the aperture surrounded by said rim, and outwardly turned portions provided at the ends of said fingers for cooperation with said rim to provide the only means for holding the stud-engaging part in assembly with the mounting part.

5. A fastener socket having a mounting part provided with an aperture therethrough, a wall of substantial height surrounding said aperture, an inwardly turned rim at the free edge of said wall, a stud-engaging part associated with said mounting part, said stud-engaging part having a continuous rigid portion at its periphery, a resilient portion inside of said rigid portion for resilient engagement with a stud, and a beaded portion at the free end of said resilient portion for holding the stud in assembled engagement with said mounting part, said beaded portion having an outer diameter larger than the diameter of an opening surrounded by said rim thereby to prevent separation of the fastener parts when the beaded portion has been snapped through the opening surrounded by said rim.

In testimony whereof, I have signed my name to this specification.

ARTHUR W. KIMBELL.